(12) United States Patent
Gaines et al.

(10) Patent No.: US 8,368,315 B2
(45) Date of Patent: Feb. 5, 2013

(54) LED LAMP COLOR CONTROL SYSTEM AND METHOD

(75) Inventors: James Gaines, Glen Ellyn, NY (US); Bernd Clauberg, Schaumburg, IL (US); Josephus A. M. Van Erp, Asten (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 274 days.

(21) Appl. No.: 12/746,551

(22) PCT Filed: Dec. 2, 2008

(86) PCT No.: PCT/IB2008/055037
§ 371 (c)(1),
(2), (4) Date: Jun. 7, 2010

(87) PCT Pub. No.: WO2009/072059
PCT Pub. Date: Jun. 11, 2009

(65) Prior Publication Data
US 2010/0264834 A1   Oct. 21, 2010

Related U.S. Application Data

(60) Provisional application No. 61/012,123, filed on Dec. 7, 2007.

(51) Int. Cl.
*H05B 41/16* (2006.01)

(52) U.S. Cl. .............. 315/247; 315/185 S; 315/224; 315/291; 315/312

(58) Field of Classification Search ............... 315/247, 315/246, 209 R, 276–279, 185 S, 224, 291, 315/307–326
See application file for complete search history.

(56) References Cited

U.S. PATENT DOCUMENTS

| | | | |
|---|---|---|---|
| 6,987,787 | B1 | 1/2006 | Mick |
| 7,173,384 | B2 | 2/2007 | Plotz et al. |
| 2005/0231459 | A1 | 10/2005 | Furukawa |
| 2006/0017402 | A1 | 1/2006 | McKinney et al. |
| 2006/0164377 | A1 | 7/2006 | Struebel et al. |

*Primary Examiner* — Tuyet Thi Vo
(74) *Attorney, Agent, or Firm* — Mark L. Beloborodov (57) ABSTRACT

An LED lamp color control system and method including an LED lamp having an LED controller 58; and a plurality of LED channels 60 operably connected to the LED controller 58, each of the plurality of LED channels 60 having a channel switch 62 in series with at least one shunted LED circuit 83, the shunted LED circuit 83 having a shunt switch 68 in parallel with an LED source 80. The LED controller 58 determines whether the LED source 80 is in a feedback controllable range, stores measured optical flux for the LED source 80 when the LED source 80 is in the feedback controllable range, and bypasses storing the measured optical flux when the LED source 80 is not in the feedback controllable range.

20 Claims, 4 Drawing Sheets

LED LAMP COLOR CONTROL SYSTEM AND METHOD

This invention was made with United States government support awarded by the U.S. Department of Energy Contract Number DE-FC26-05NT42342. The United States government has certain rights in this invention.

The technical field of this disclosure is power supplies, particularly, an LED lamp color control system and method.

Traditionally, incandescent and fluorescent illuminating devices have been used as light sources in automobiles and other vehicles. However, significant advances in the technology of light emitting diodes (LEDs) have made LEDs attractive for use in vehicles, because of their long operating life, high efficiency, and low profile. LEDs can now generate white light nearly as efficiently as a compact fluorescent lamp, and efficiencies are expected to increase. To fully realize the energy savings of the LEDs, the electronics that drive them must also be efficient.

Self-contained LED lamps, such as LED System-in-Modules (LED SIMs), for general lighting applications are being developed that use multiple, different colored LEDs with one or a limited number of integrated circuits. The integrated circuits include sensing, drive, and control circuits for the LED lamp. The user is able to control the lamp color and intensity.

To generate light over the visible spectrum, the light output from different color LEDs can be combined in particular proportions to produce a desired color from an LED lamp. For example, one LED can generate red light, one can generate green light, and one can generate blue light. The Red-Green-Blue (RGB) combination can generate any color desired and can be supplemented with an LED generating amber (A) or white (W) light to adjust the color rendering index (CRI) of the lamp. The CRI indicates how well the lamp renders colors of objects compared to a standard illumination source, such as daylight or an incandescent lamp. RGBA and RGBW indicate Red-Green-Blue-Amber and Red-Green-Blue-White four LED lamps, respectively.

Electrical current to each LED source in the four LED lamp is controlled independently to allow the lamp to cover a full range of colors and CRIs. One power supply arrangement for the four LED lamp is two parallel LED channels with two LED sources in serial in each of the LED channels. The basic electronic topology can be a hysteretic buck converter with a channel switch controlling the current flow through each channel. Both the pulse width and amplitude of the current flow through each channel are variable. Upper and lower hysterisis operating limits set the pulse amplitude. A shunt switch parallel to each LED source controls the current flow through each LED source by shorting out the particular LED source. The hysterisis limits can be set to maximize the duty cycle for one of LED sources in each channel. The channel current can be reduced to produce the required amount of light with the duty cycle of one LED source in each channel maximized. This saves energy in the electronics and results in efficient generation of light by the LEDs, which generally emit light more efficiently at lower current than at higher current.

The present generation of LED lamps can generate light over a range of colors, but problems arise under certain conditions where control of some or all colors in a multi-color LED system is not feasible. Because of the limited ability to set current levels and pulse widths, and because of tolerances in various components and supply values, the accuracy of color control that can be obtained depends on a number of items, such as dimming level, color coordinates, LED spectra, and the control algorithm. If no measures are taken to release control when approaching problem regions, the LED lamp is likely to exhibit unpredictable behavior and instability in color and intensity.

One problem is optical flux measurement errors. The lamp system individually measures the optical flux of the light from LED sources generating each color, with the LED sources operating in a PWM mode. At certain times, the LED current waveforms are changed so that only one LED source color is on and a flux measurement for that LED source color is performed. In addition, a background flux level is measured with all LED sources off. The optical flux measurement device, such as a photodiode, has a response time that must be taken into account in making the measurement. When the optical flux measurement is very responsive with respect to the LED current frequency, the optical flux signal is sensitive to oscillations in the current waveform, which can lead to color errors from an optical flux measurement that fails to represent the actual average light level. When the optical flux measurement is not very responsive with respect to the LED current frequency, the optical flux signal requires a large rise time to stabilize at a final value for measurement. When the LED pulse width is too narrow, the LED source can be off before the measurement is made, leading to unstable color control.

This problem can be illustrated by considering a lamp system operating at 1 kHz, so that the maximum pulse width is 1 ms. Assuming the optical flux measurement device stabilizes in 20 µs, the flux measurement can be performed 20 µs after the pulse begins, i.e., 2% into the maximum pulse width. The lamp user can select color/intensity combinations that would result in a duty cycle for one or more colors being less than 2% of the maximum pulse width, e.g., yellowish colors contain very small portions of blue; cyan colors contain very small portions of red; and pink/purple colors contain very small portions of green. When the duty cycle of a particular color is less than 2%, the flux measurement occurs after the particular LED source is off, and the control system will obtain a false reading of the optical flux.

A number of additional problems often arise with optical flux measurement and color control for the present generation of LED lamps:

Rise and fall times of shunt switches parallel to each LED source can be a significant fraction of the entire pulse;

Hysterisis period can be on the order of the PWM pulse width, so that the fractional hysterisis period, which does not have the same average current as the full periods, is present in each PWM pulse;

Rise or fall time of the hysteretic current waveform can be so short that overshoot or undershoot in the current waveform is significant;

Phase locking can occur between the PWM period and the hysteretic current waveform period, causing the optical flux measurement to occur systematically at a fixed phase of the hysteretic current waveform;

Large optical sensor errors can occur from high signal-to-noise at low light levels, temperature dependence of sensor, or the like;

Erroneous optical flux measurement readings can occur from photodiode failure, interference, or the like;

Oscillations in the LED current caused by the hysteretic buck converter can be of such low frequency that photodiode filtering is no longer effective and flux measurements are not representative of the average flux; and     Overly large LED efficiency can occur in one of the LED source colors, leading to short duty cycles for that particular color.

It would be desirable to have an LED lamp color control system and method that would overcome the above disadvantages.

One aspect of the present invention provides an LED lamp having an LED controller; and a plurality of LED channels operably connected to the LED controller, each of the plurality of LED channels having a channel switch in series with at least one shunted LED circuit, the shunted LED circuit having a shunt switch in parallel with an LED source. The LED controller determines whether the LED source is in a feedback controllable range, stores measured optical flux for the LED source when the LED source is in the feedback controllable range, and bypasses storing the measured optical flux when the LED source is not in the feedback controllable range.

Another aspect of the present invention provides a method of LED lamp color control including providing an LED lamp having a plurality of LED channels, each of the plurality of LED channels having a channel switch in series with at least one shunted LED circuit, the shunted LED circuit having a shunt switch in parallel with an LED source; initializing LED lamp settings for the LED lamp; determining whether the LED source is in a feedback controllable range; storing measured optical flux for the LED source when the LED source is in the feedback controllable range; and bypassing storage of the measured optical flux when the LED source is not in the feedback controllable range.

Another aspect of the present invention provides a system of LED lamp color control including an LED lamp having a plurality of LED channels, each of the plurality of LED channels having a channel switch in series with at least one shunted LED circuit, the shunted LED circuit having a shunt switch in parallel with an LED source; means for initializing LED lamp settings for the LED lamp; means for determining whether the LED source is in a feedback controllable range; means for storing measured optical flux for the LED source when the LED source is in the feedback controllable range; and means for bypassing storage of the measured optical flux when the LED source is not in the feedback controllable range.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

Figure 1:
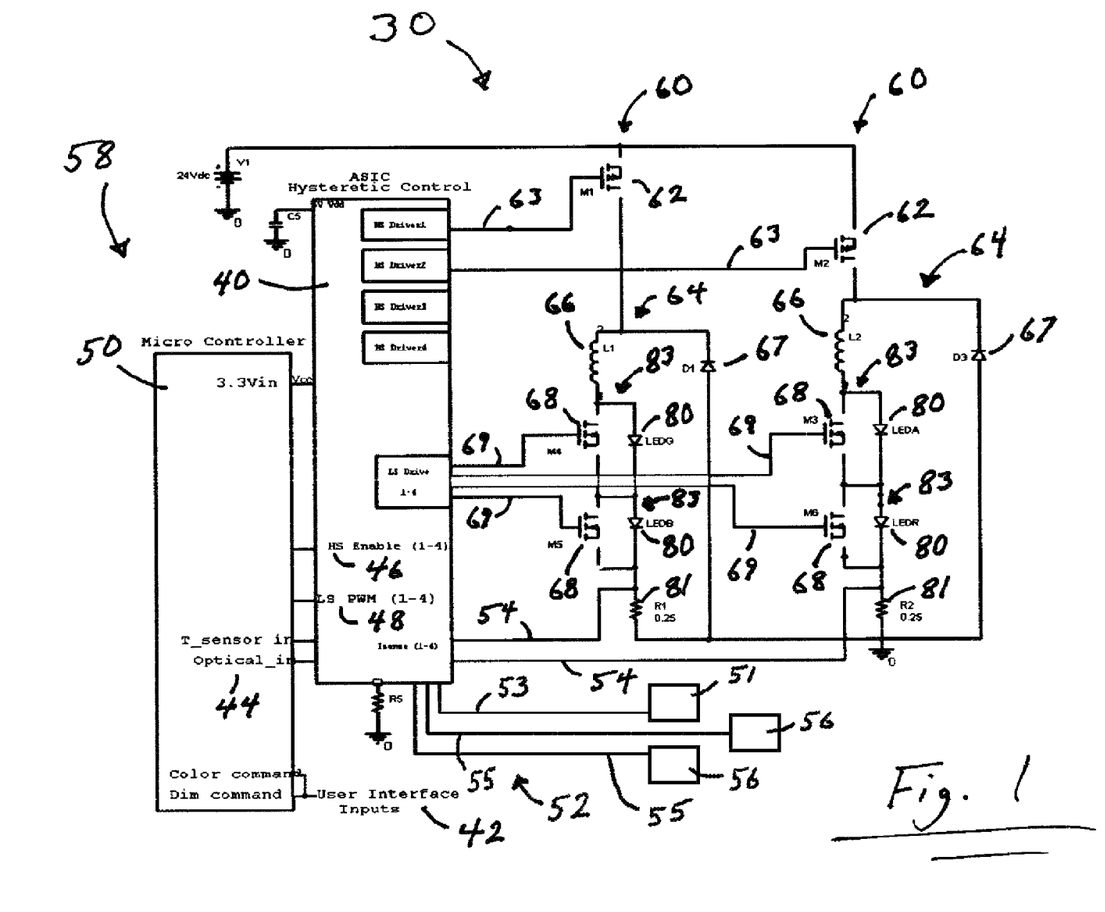
FIG. 1 is a schematic diagram of an LED lamp color control system in accordance with the present invention.

FIG. 1 is a schematic diagram of an LED lamp color control system in accordance with the present invention. In this example, the LED lamp is a dual channel circuit, dual LED circuit lamp, i.e., the LED lamp has two LED channels with two shunted LED circuits per LED channel.

The LED lamp 30 employing the color control system includes an LED controller 58, which has a microcontroller 50 operably connected to an application specific integrated circuit (ASIC) hysteretic control 40, controlling power to two LED channels 60. Each LED channel 60 has a channel switch 62 and an LED circuit 64 connected in series between voltage and common. Each channel switch 62 receives a channel switch control signal 63 from the ASIC hysteretic control 40 to control current flow through the LED channel 60. In this example, each LED circuit 64 includes a diode 67 in parallel with an inductor 66 in series with two shunted LED circuits 83 and a resistor 81. Each shunted LED circuit 83 includes a shunt switch 68 in parallel with an LED source 80. The LED source 80 includes one or more LEDs connected in series and/or parallel to each other to generate light of a desired color or wavelength. Each of the shunt switches 68 receives a shunt switch control signal 69 from the ASIC hysteretic control 40. The shunt switch 68 shorts the channel current around its associated LED source to control the light output of the associated LED source. In this example, the basic electronic topology is a hysteretic buck converter. The LED controller 58 includes data storage for storing operating data, such as measured optical flux for the LED sources 80. Those skilled in the art will appreciate that the LED controller 58 can be a single integrated circuit or a number of operably connected integrated circuits providing the desired functions. For example, the LED controller 58 can be a single integrated circuit including a microprocessor with built-in memory, or can be two integrated circuits with one including a microprocessor and the other including memory.

The color output of each LED source 80 can be selected to produce the light output from the LED lamp 30 as desired for a particular purpose. In one embodiment, the LED sources are Red-Green-Blue-Amber (RGBA). In another embodiment, the LED sources are Red-Green-Blue-White (RGBW). In one embodiment, the LED sources 80 generating green and blue light can be in one LED channel 60 and the LED sources 80 generating amber and red light can be in another LED channel 60.

The microcontroller 50 receives user input signals 42, such as color command signals, dim command signals, or the like. The microcontroller 50 can also receive microcontroller feedback signals 44, such as temperature sensor signals, optical sensor signals, or the like, as desired for a particular application. In one embodiment, the feedback signals 44 are generated by the ASIC hysteretic control 40 from control feedback signals 52, such as temperature sensor signals, optical sensor signals, or the like, as desired for a particular application. The microcontroller 50 generates a high side (HS) enable signal 46 and a low side pulse width modulation (LS PWM) signal 48, which are provided to the ASIC hysteretic control 40, in response to the user input signals 42, and, optionally, the microcontroller feedback signals 44.

The ASIC hysteretic control 40 also receives current feedback signals 54 which indicate the current through each of the LED channels 60 and is responsive to the current feedback signals 54 to adjust the channel switch control signals 63. The ASIC hysteretic control 40 generates the channel switch control signals 63 and the shunt switch control signals 69 in response to the HS enable signals 46, LS PWM signals 48, current feedback signals 54, and, optionally, the control feedback signals 52.

Figure 2A:
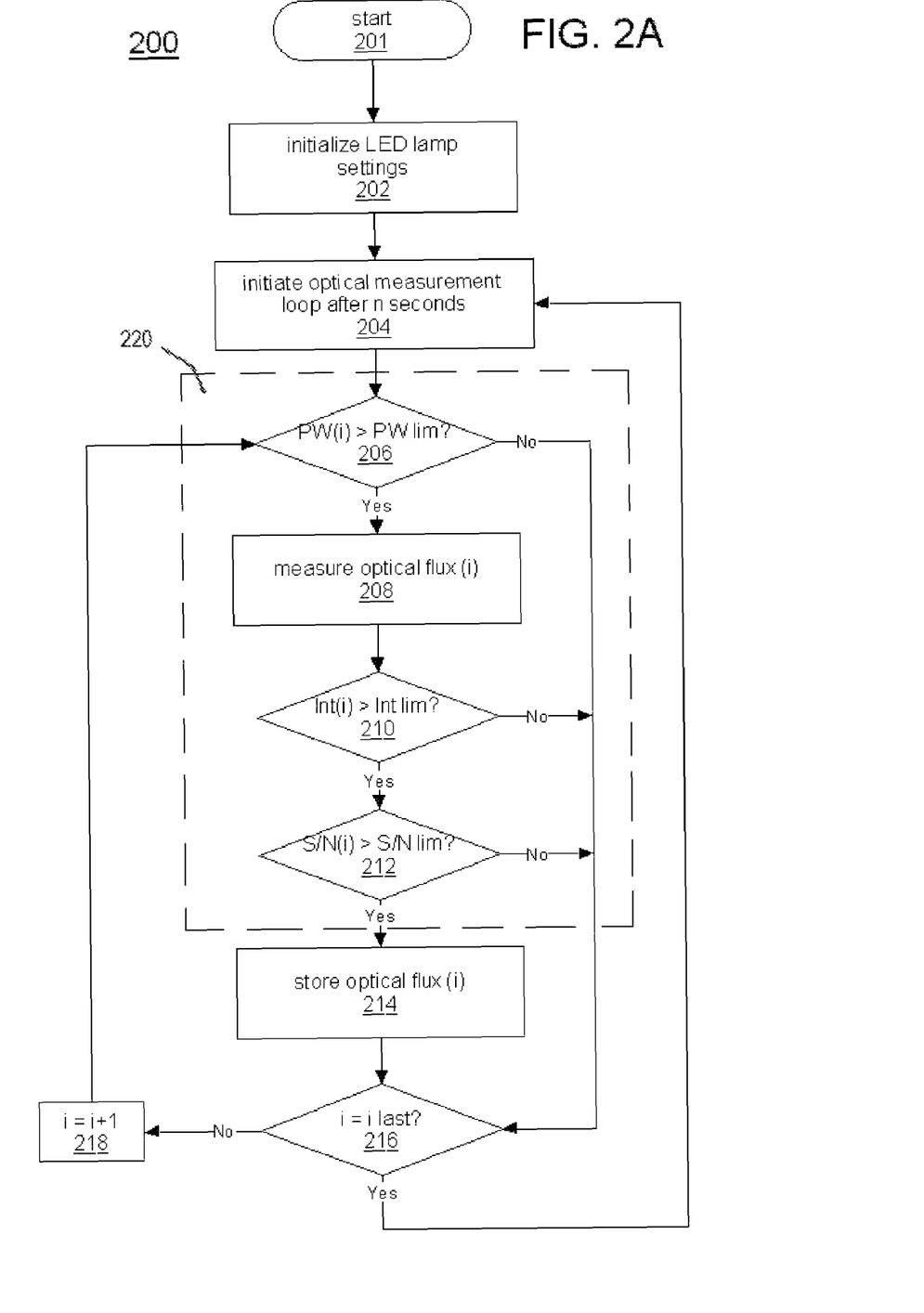
FIGS. 2A-2B are flow charts of LED lamp color control methods in accordance with the present invention.
Figure 2B:
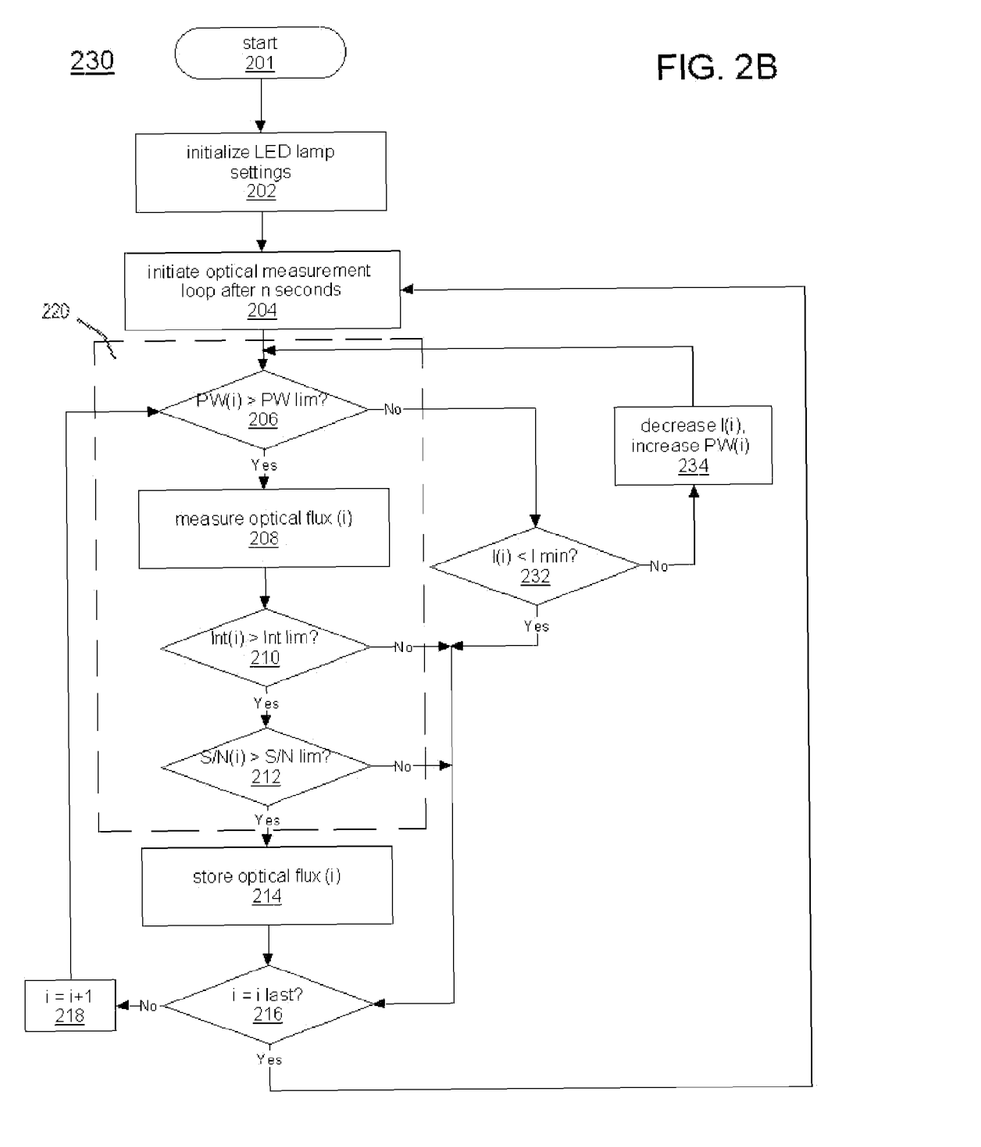

In operation, the user provides user input signals 42 to the microcontroller 50, which generates HS enable signals 46 and LS PWM signals 48. The ASIC hysteretic control 40 receives the HS enable signals 46 and LS PWM signals 48 and generates the channel switch control signals 63 and shunt switch control signals 69. The LED controller 58 can implement the LED color control method as described in association with FIG. 2 below in generating the channel switch control signals 63 and shunt switch control signals 69. Referring to FIG. 1, a channel switch control signal 63 is provided to each of the channel switches 62 to control current flow through the LED channel 60 and a shunt switch control signal 69 is provided to each of the shunt switches 68 to control the light output of the associated LED source. In one embodiment, the ASIC hysteretic control 40 receives and is responsive to current feedback signals 54 from the LED channels 60. In another embodiment, the ASIC hysteretic control 40 receives and is responsive to control feedback signals 52, such as a temperature feedback signal 53 from a temperature sensor 51 and/or optical flux feedback signals 55 from one or more optical flux sensors 56. The optical flux sensor 56 can be an amplified photodiode, with several discrete values of photodiode amplifier gain to allow good signal-to-noise ratio for optical flux measurements at different LED light output levels. Those skilled in the art will appreciate that the LED controller 58 can receive system control signals as desired for a particular lighting system application. System control signals can be generated by and/or in accordance with wired control schemes, such as a DALI protocol, a DMX protocol, or the like, or with wireless control schemes, such as a Zigbee protocol or the like. In one embodiment, the LED controller 58 can transmit system control signals to other lamps in a lighting system to direct the lamps to make the same changes as the originating lamp made. For example, the LED controller 58 can transmit a system control signal instructing the other lamps in a room to change light color output to match color changes in the originating lamp, as may be required to reduce power loss in the originating lamp.

Figure 3:
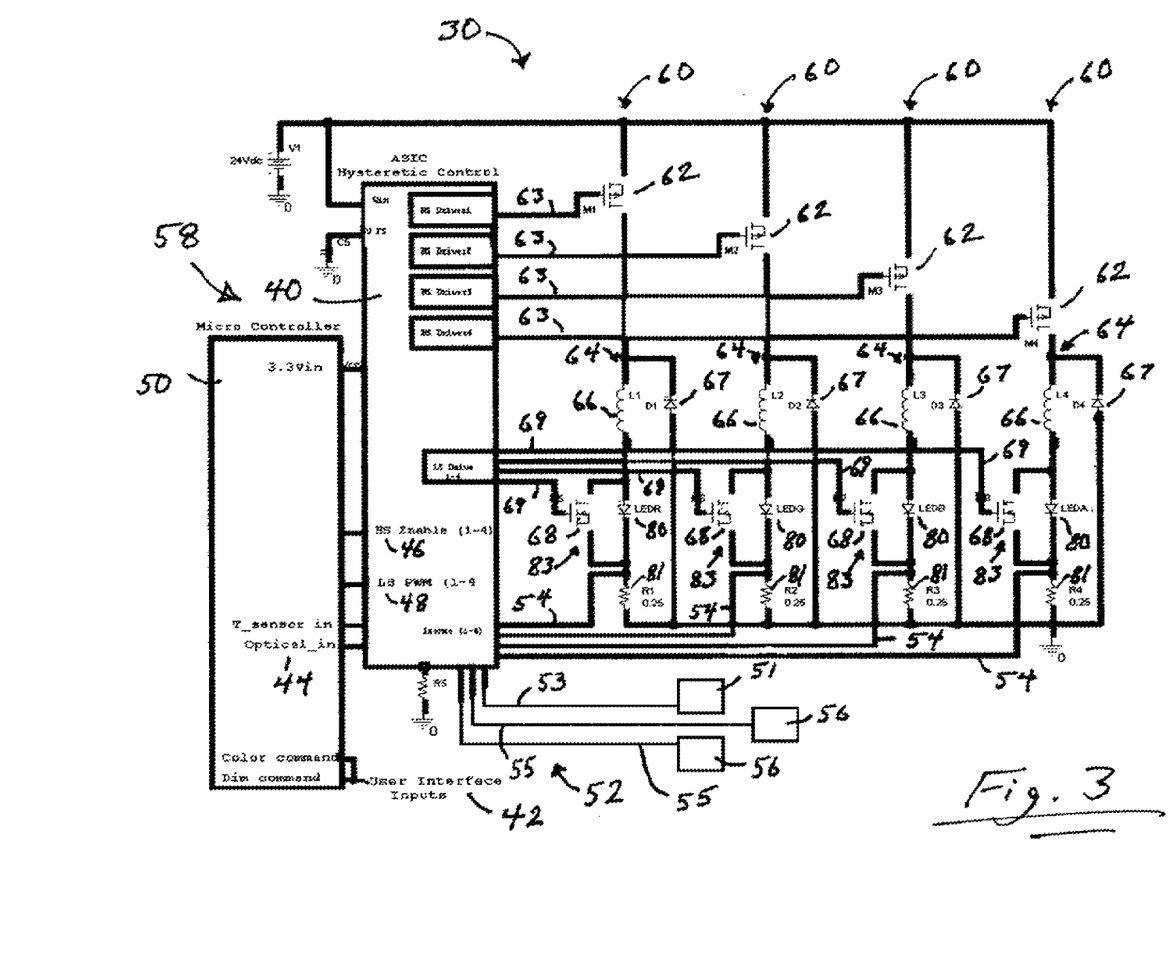
FIG. 3 is a schematic diagram of another embodiment of an LED lamp color control system in accordance with the present invention.

FIGS. 2A-2B, in which like elements share like reference numbers, are flow charts of LED lamp color control methods in accordance with the present invention. FIG. 2A is a flow chart for an LED lamp with constant LED current. FIG. 2B is a flow chart for an LED lamp with variable LED current. In one embodiment, the LED lamp is a dual channel circuit, dual LED circuit lamp as illustrated in FIG. 1. In another embodiment, the LED lamp is a quad channel circuit, single LED circuit lamp as illustrated in FIG. 3. Those skilled in the art will appreciate that the LED color control methods of FIGS. 2A-2B can be used in any LED lamp configuration in which any number of independently controlled LED sources generate discrete colors. In one embodiment, the LED lamp employs an application specific integrated circuit (ASIC). In another embodiment, the LED lamp employs discrete components.

The LED color control methods prevent loss of color control when lamp input parameters are changed to conditions where flux measurement of one or more of the LED colors is no longer feasible, i.e., when the LED source for the LED color is outside of the feedback controllable range. The LED lamp stores the latest valid measured optical flux for each color and only refreshes that stored value with a new value for the measured optical flux when the conditions allow a valid flux measurement. The software running on the LED lamp controller monitors conditions to determine when valid optical flux measurements can be made. Optical flux feedback is used primarily to correct for LED source performance degradation over extended times and degradation is most likely for LED sources driven at full output, so temporarily using a stored value for measured optical flux for LED sources driven at low output has a minimal effect on LED lamp performance.

Referring to FIG. 2A, the method 200 includes one or more ways of determining whether the LED source is in a feedback controllable range 220. The feedback controllable range as defined herein is the range of operation of an LED source in the LED lamp where a feedback signal, such as the optical flux feedback signal indicating optical flux, provides valid feedback to the controller allowing responsive operation of the LED source. Examples of determining whether the LED source is in a feedback controllable range 220 include determining whether pulse width for the LED source is greater than a pulse width limit 206, determining whether intensity for the measured optical flux for the LED source is greater than an intensity limit 210, determining whether signal-to-noise ratio for the measured optical flux for the LED source is greater than a signal-to-noise ratio limit 212, or the like. The examples can be used singly, in combination, or in any order desired. Those skilled in the art will appreciate that the particular ways of determining whether the LED source is in a feedback controllable range 220 can be selected as desired for a particular application and LED lamp configuration.

The method 200 starts at 201 and includes initializing LED lamp settings for the LED lamp 202 and initiating an optical measurement loop after n seconds 204. Those skilled in the art will appreciate that the first optical measurement on entering the optical measurement loop can be performed any time and that a delay of n seconds is not required, and after that the optical measurement can be performed every n seconds on a periodic basis. It is determined whether the pulse width for the $i^{th}$ color PW(i) is greater than a pulse width limit PW lim 206. When the pulse width for the $i^{th}$ color PW(i) is not greater than the pulse width limit PW lim, it is determined whether the $i^{th}$ color is the last i color 216. When the $i^{th}$ color is the last i color, the method 200 returns to initiating an optical measurement loop after n seconds 204. When the $i^{th}$ color is not the last i color, the $i^{th}$ color is incremented to the i+1 color and the optical measurement loop continues with determining whether the pulse width for the $i^{th}$ color PW(i) is greater than the pulse width limit PW lim 206 for the next color. The method 200 can continue with the LED controller 58 determining whether the LED source 80 is in the feedback controllable range for each of the LED sources 80 in the plurality of LED channels 60.

When the pulse width for the $i^{th}$ color PW(i) is greater than the pulse width limit PW lim, optical flux for the $i^{th}$ color is measured 208 and it is determined whether intensity for the $i^{th}$ color Int(i) for the optical flux is greater than an intensity limit Int lim 210. When the intensity for the $i^{th}$ color Int(i) for the optical flux is not greater than the intensity limit Int lim, it is determined whether the $i^{th}$ color is the last i color 216 and the method 200 continues. When the intensity for the $i^{th}$ color Int(i) for the optical flux is greater than the intensity limit Int lim, it is determined whether a signal-to-noise ratio for the $i^{th}$ color S/N(i) for the optical flux is greater than an signal-to-noise ratio limit S/N lim 212. When the signal-to-noise ratio for the $i^{th}$ color S/N(i) for the optical flux is not greater than an signal-to-noise ratio limit S/N lim, it is determined whether the $i^{th}$ color is the last i color 216 and the method 200 continues. When the signal-to-noise ratio for the $i^{th}$ color S/N(i) for the optical flux is greater than an signal-to-noise ratio limit S/N lim, the optical flux for the $i^{th}$ color is stored for use 214. It is determined whether the $i^{th}$ color is the last i color 216 and the method 200 continues.

Initializing LED lamp settings for the LED lamp 202 can include initializing LED lamp settings such as color settings, dim settings, and the like. The initial values can be predetermined by the manufacturer, lighting designer, or can be stored user inputs from a previous use. When the user input is changed during operation, the method 200 can re-start at the initializing LED lamp settings for the LED lamp 202 to reflect the changed user input.

Initiating an optical measurement loop after n seconds 204 can include initiating an optical measurement loop after a predetermined number of seconds. In one example, the measurement loop initiates the optical measurement loop about every 7 milliseconds, equivalent to a frequency of about 140 Hertz. Those skilled in the art will appreciate that the time can be selected to prevent perception of color artifacts (flicker), although a slower time on the order of minutes can be used if other measures are taken to minimize flicker.

Determining whether the pulse width for the $i^{th}$ color PW(i) is greater than a pulse width limit PW lim 206 disables new optical flux measurement and/or storage for any color when the pulse width is below a pulse width limit, i.e., the duty cycle for the color is below a certain percentage of the maximum duty cycle, such as 2%. The LED source is not in the feedback controllable range when the pulse width for the LED source is not greater than the pulse width limit. The most recent valid flux measurement is retained, so that color control can continue, even with the short duty cycle. The stored optical flux measurement is used until the LED lamp returns to the feedback controllable range where new valid flux measurements can be made and full color control can be resumed. Full color control can be maintained for colors having a pulse width above the pulse width limit, even though one or more colors have a pulse width below the pulse width limit. Outside the feedback controllable range, the LED sources are generally not being driven hard, such as regions of low duty cycle and/or low light output.

Measuring optical flux for the $i^{th}$ color 208 can include measuring optical flux with an optical sensor, such as a photodiode, which generates an optical flux signal.

Determining whether intensity for the $i^{th}$ color Int(i) for the optical flux is greater than an intensity limit Int lim 210 disables new optical flux storage for any color when the intensity is less than the intensity limit, i.e., when the color/intensity selection causes one or more of the LED colors to fall outside of the feedback controllable range. The LED source is not in the feedback controllable range when the intensity for the measured optical flux for the LED source is not greater than the intensity limit. The stored optical flux measurement is used until the LED lamp returns to the feedback controllable range so new flux measurements can be made and full color control can be resumed.

Determining whether a signal-to-noise ratio for the $i^{th}$ color S/N(i) for the optical flux is greater than a signal-to-noise ratio limit S/N lim 212 disables new optical flux storage for any color when the signal-to-noise ratio is less than the signal-to-noise ratio limit, i.e., when the color/intensity selection causes one or more of the LED colors to fall outside of the feedback controllable range. The LED source is not in the feedback controllable range when the signal-to-noise ratio for the measured optical flux for the LED source is not greater than the signal-to-noise ratio limit. The stored optical flux measurement is used until the LED lamp returns to the feedback controllable range so new optical flux measurements can be made and full color control can be resumed. In one embodiment, the determining 212 includes making optical flux measurements a predetermined number of times, such as 100 times, calculating a standard deviation of the optical flux measurements, using the standard deviation as the signal-to-noise ratio for the $i^{th}$ color S/N(i), and determining whether the signal-to-noise ratio for the $i^{th}$ color S/N(i) for the optical flux is greater than an signal-to-noise ratio limit S/N lim. Using a number of optical flux measurements detects erosion of the signal-to-noise ratio while avoiding spurious optical flux measurements.

Storing the optical flux for the $i^{th}$ color for use 214 can include storing the optical flux for the $i^{th}$ color in the LED controller. The stored optical flux can be used as the feedback signal when the LED lamp is operating outside the feedback controllable range. In one embodiment, the stored optical flux can be tracked over time for a predetermined LED current. When the stored optical flux is less than a stored optical flux limit, the LED controller can generate an LED lamp end-of-life signal directing the user to replace the LED lamp.

The LED lamp can include measures to reduce power dissipation in the electronics of the LED lamp that can affect color control. LED current frequency can be reduced by increasing the difference in the hysteretic limits. Lower frequency can adversely affect the color control, when the optical flux signal filtering is insufficient to filter out the lower frequency. The method 200 can include disabling new optical flux storage for any color when the LED current frequency is less than a LED current frequency limit or when the difference between the hysterisis values is greater than a hysterisis values difference limit.

The method 200 can also include measures to maintain LED lamp operation within the feedback controllable range. The LED lamp can reduce the color rendering index (CRI) to maintain higher intensity of certain LED colors and therefore to maintain color feedback control of those LED colors. In the example of a Red-Green-Blue-Amber (RGBA) LED lamp, an LED color with a low duty cycle can be turned off at the expense of the CRI and the other colors rebalanced to maintain the correct color coordinates and feedback control. Similarly, color temperature can be traded off with duty cycles to maintain color feedback control. The goal is to keep all duty cycles above the minimum level, so that the optical flux for all the LED sources can be measured for the maximum amount of time.

FIG. 2B is a flow chart for an LED lamp with variable LED current. It is determined whether the pulse width for the $i^{th}$ color PW(i) is greater than a pulse width limit PW lim 206. When the pulse width for the $i^{th}$ color PW(i) is not greater than the pulse width limit PW lim, it is determined whether LED current for the $i^{th}$ color I(i) is less than a minimum LED current I min 232. When the LED current for the $i^{th}$ color I(i) is less than the minimum LED current I min, it is determined whether the $i^{th}$ color is the last i color 216 and the method 200 continues. When the LED current for the $i^{th}$ color I(i) is not less than the minimum LED current I min, the LED current for the $i^{th}$ color I(i) is decreased and the pulse width for the $i^{th}$ color PW(i) is increased 234. The method 200 continues with determining whether the pulse width for the $i^{th}$ color PW(i) is greater than a pulse width limit PW lim 206.

Determining whether the pulse width for the $i^{th}$ color PW(i) is greater than a pulse width limit PW lim 206 allows adjustment of the LED current when the current is not already at the minimum LED current. Decreasing the LED current and increasing the pulse width 234 maintains the same light output from the LED source while improving the ability to measure the optical flux due to the wider pulse width. In one embodiment, the minimum LED current I min is determined at discrete current levels during manufacture since the spectral output of LED sources changes with current.

The minimum LED current I min can depend on the LED lamp design and can further depend on the requested user input.

When the operation of each LED source in the LED lamp is independent of the other LED sources in the LED lamp, such as in the example illustrated by FIG. 3, the minimum LED current I min depends on the LED lamp design. In this case, the minimum LED current I min is determined by factors such as the ability of the LED lamp electronics to generate stable channel currents, the ability of the LED sources to generate stable light output, the ability of the photodiodes to measure stable optical fluxes, the calibration of particular currents, and the like. These factors can also determine the minimum LED current I min when the operation of each LED source in the LED lamp is not independent of the other LED sources in the LED lamp, as long as the user input does not require a maximum duty cycle for one of the LED sources in an LED channel.

When the operation of each LED source in the LED lamp is not independent of the other LED sources in the LED lamp, such as in the example illustrated by FIG. 1, the minimum LED current I min can depend on the user input, i.e., the color and dim output requested by the user. In this example, the LED lamp includes LED channels with more than one LED circuit in each LED channel, so each LED circuit in an LED channel receives the same channel current. Each LED circuit includes an LED source. In order to measure optical flux, the maximum duty cycle for each LED source is limited to less than 100 percent, such as about 90 percent or more as desired for a particular application. A user input for a requested operating point can require one of the LED sources in an LED channel to operate at the maximum duty cycle with a particular current amplitude as required to satisfy the user input. The current amplitude cannot be reduced without reducing the overall light output from the maximum duty cycle LED source. Although another LED source in the LED channel may only have a small light output for the user input, and it would be desirable to increase the duty cycle and reduce the current amplitude for the small light output LED source, the channel current amplitude is maintained to maintain the requested light output of the other LED source operating at the maximum duty cycle. Therefore, the minimum LED current I min for all of the LED sources in the LED channel is the same and is determined by the LED source operating at the maximum duty cycle.

In one embodiment, the decreasing LED current and increasing pulse width 234 further includes adjusting gain of the optical sensor. The gain of the optical sensor is changed to ensure that the optical sensor signal is large enough to provide accurate measurement of the optical flux with an analog to digital (A/D) converter. The gain of the optical sensor is changed inversely to the change in LED intensity, which depends on LED current.

FIG. 3 in which like elements share like reference numbers with FIG. 1, is a schematic diagram of another embodiment of an LED lamp color control system in accordance with the present invention. In this example, the LED lamp is a quad channel circuit, single LED circuit lamp, i.e., the LED lamp has four LED channels with one shunted LED circuit per LED channel. A different color LED source can be provided in each of the LED channels, so that the current can be controlled for each of the LED colors. Power losses to the shunt switches can be minimized because the current through an LED channel can be turned off with the channel switch for the LED channel when a particular color is not needed.

The LED lamp 30 employing the color control system includes an LED controller 58, which has a microcontroller 50 operably connected to an application specific integrated circuit (ASIC) hysteretic control 40, controlling power to four LED channels 60. Each LED channel 60 has a channel switch 62 and LED circuit 64 connected in series between voltage and common. Each channel switch 62 receives a channel switch control signal 63 from the ASIC hysteretic control 40 to control current flow through the LED channel 60. In this example, each LED circuit 64 includes a diode 67 in parallel with an inductor 66 in series with a shunt switch 68. Each of the shunt switches 68 receives a shunt switch control signal 69 from the ASIC hysteretic control 40 and is connected in parallel to an LED source 80. The shunt switch 68 shorts the channel current around its associated LED source to control the light output of the associated LED source. In this example, the basic electronic topology is a hysteretic buck converter. The inductor 66 for each LED channel 60 can be sized to provide the desired switching frequency for the particular LED source 80 in that LED channel 60. In one embodiment, the LED sources 80 in each of the LED channels 60 can generate light of different colors.

In operation, the user provides user input signals 42 to the microcontroller 50, which generates HS enable signals 46 and LS PWM signals 48. The ASIC hysteretic control 40 receives the HS enable signals 46 and LS PWM signals 48 and generates the channel switch control signals 63 and shunt switch control signals 69. The LED controller 58 can implement the LED color control method as described in association with FIG. 2 above in generating the channel switch control signals 63 and shunt switch control signals 69. Referring to FIG. 3, a channel switch control signal 63 is provided to each of the channel switches 62 to control current flow through the LED channel 60 and a shunt switch control signal 69 is provided to each of the shunt switches 68 to control the light output of the associated LED source.

In one embodiment, the inductor 66 for each LED channel 60 includes two or more inductors, with one of the inductors sized to saturate at a high current. The current is high during normal operation at the design operating point generating white light at an optimum color and CRI, so one inductor in each LED channel 60 is normally saturated. When the current in the LED channel 60 is low, such as operation at a different color and/or CRI from the design operating point, the one saturated inductor in each LED channel 60 becomes unsaturated. This increases the total inductance of the inductor 66 and reduces the switching frequency for the LED channel 60. The two or more inductors of the inductor 66 for each LED channel 60 can be selected so the hysterisis window is a constant percentage of the current level through the LED channel 60, so that the switching frequency changes smoothly with decreasing current level. In one embodiment, the practical upper limit on frequency is about 2 MHz. The lower frequency limit depends on the PWM frequency and can be much greater than the PWM frequency, such as two or more orders of magnitude greater than the PWM frequency.

While the embodiments of the invention disclosed herein are presently considered to be preferred, various changes and modifications can be made without departing from the scope of the invention. The scope of the invention is indicated in the appended claims, and all changes that come within the meaning and range of equivalents are intended to be embraced therein.

The invention claimed is:

1. An LED lamp comprising:
an LED controller 58; and
a plurality of LED channels 60 operably connected to the LED controller 58, each of the plurality of LED channels 60 having a channel switch 62 in series with at least one shunted LED circuit 83, the shunted LED circuit 83 having a shunt switch 68 in parallel with an LED source 80;
wherein the LED controller 58 determines whether the LED source 80 is in a feedback controllable range, stores measured optical flux for the LED source 80 when the LED source 80 is in the feedback controllable range, and bypasses storing the measured optical flux when the LED source 80 is not in the feedback controllable range.

2. The LED lamp of claim 1 wherein the LED controller 58 determines whether the LED source 80 is in the feedback controllable range by determining whether pulse width for the LED source 80 is greater than a pulse width limit, the LED source 80 being in the feedback controllable range when the pulse width for the LED source 80 is greater than the pulse width limit and the LED source 80 not being in the feedback controllable range when the pulse width for the LED source 80 is not greater than the pulse width limit.

3. The LED lamp of claim 1 wherein the LED controller 58 bypasses storing the measured optical flux when pulse width for the LED source is not greater than a pulse width limit and LED current for the LED source 80 is less than a minimum LED current.

4. The LED lamp of claim 1 wherein the LED controller 58 determines whether the LED source 80 is in the feedback controllable range by determining whether intensity for the measured optical flux for the LED source 80 is greater than an intensity limit, the LED source 80 being in the feedback controllable range when the intensity for the measured optical flux for the LED source 80 is greater than the intensity limit and the LED source 80 not being in the feedback controllable range when the intensity for the measured optical flux for the LED source 80 is not greater than the intensity limit.

5. The LED lamp of claim 1 wherein each of the LED sources 80 in the plurality of LED channels 60 generates light of a different color.

6. The LED lamp of claim 1 wherein the LED controller 58 determines whether the LED source 80 is in the feedback controllable range for each of the LED sources 80 in the plurality of LED channels 60.

7. The LED lamp of claim 1 wherein the LED controller 58 decreases LED current for the LED source 80 and increases pulse width for the LED source 80 when the pulse width for the LED source 80 is not greater than a pulse width limit and LED current for the LED source 80 is not less than a minimum LED current.

8. The LED lamp of claim 7 further comprising an optical sensor 56 operably connected to measure optical flux for the LED source 80, wherein the LED controller 58 increases gain of the optical sensor 56 when the LED controller 58 decreases the LED current for the LED source 80.

9. The LED lamp of claim 1 wherein the LED controller 58 determines whether the LED source 80 is in the feedback controllable range by determining whether signal-to-noise ratio for the measured optical flux for the LED source 80 is greater than a signal-to-noise ratio limit, the LED source 80 being in the feedback controllable range when the signal-to-noise ratio for the measured optical flux for the LED source 80 is greater than the signal-to-noise ratio limit and the LED source 80 not being in the feedback controllable range when the signal-to-noise ratio for the measured optical flux for the LED source 80 is not greater than the signal-to-noise ratio limit.

10. The LED lamp of claim 9 wherein the signal-to-noise ratio is a standard deviation of a predetermined number of optical flux measurements.

11. A method of LED lamp color control comprising:
providing an LED lamp having a plurality of LED channels, each of the plurality of LED channels having a channel switch in series with at least one shunted LED circuit, the shunted LED circuit having a shunt switch in parallel with an LED source;
initializing LED lamp settings for the LED lamp 202;
determining whether the LED source is in a feedback controllable range 220;
storing measured optical flux for the LED source when the LED source is in the feedback controllable range 214; and
bypassing storage of the measured optical flux when the LED source is not in the feedback controllable range.

12. The method of claim 11 wherein the determining 220 comprises determining whether pulse width for the LED source is greater than a pulse width limit 206, the LED source being in the feedback controllable range when the pulse width for the LED source is greater than the pulse width limit and the LED source not being in the feedback controllable range when the pulse width for the LED source is not greater than the pulse width limit.

13. The method of claim 11 further comprising:
determining whether pulse width for the LED source is greater than a pulse width limit 206;
determining whether LED current for the LED source is less than a minimum LED current 232; and
bypassing storage of the measured optical flux when the pulse width for the LED source is not greater than the pulse width limit and the LED current for the LED source is less than the minimum LED current.

14. The method of claim 11 wherein the determining 220 comprises determining whether intensity for the measured optical flux for the LED source is greater than an intensity limit 210, the LED source being in the feedback controllable range when the intensity for the measured optical flux for the LED source is greater than the intensity limit and the LED source not being in the feedback controllable range when the intensity for the measured optical flux for the LED source is not greater than the intensity limit.

15. The method of claim 11 further comprising determining whether the LED source is in the feedback controllable range for each of the LED sources in the plurality of LED channels.

16. The method of claim 11 further comprising:
determining whether pulse width for the LED source is greater than a pulse width limit 206;
determining whether LED current for the LED source is less than a minimum LED current 232; and
decreasing the LED current for the LED source and increasing the pulse width for the LED source 234 when the pulse width for the LED source is not greater than the pulse width limit and the LED current for the LED source is not less than the minimum LED current.

17. The method of claim 16 wherein the LED Lamp has an optical sensor operably connected to measure optical flux for the LED source, further comprising increasing gain of the optical sensor in response to the decreasing LED current for the LED source.

18. The method of claim 11 wherein the determining 220 comprises determining whether signal-to-noise ratio for the measured optical flux for the LED source is greater than a signal-to-noise ratio limit 212, the LED source being in the feedback controllable range when the signal-to-noise ratio for the measured optical flux for the LED source is greater than the signal-to-noise ratio limit and the LED source not being in the feedback controllable range when the signal-to-noise ratio for the measured optical flux for the LED source is not greater than the signal-to-noise ratio limit.

19. The method of claim 18 wherein the signal-to-noise ratio is a standard deviation of a predetermined number of optical flux measurements.

20. A system of LED lamp color control comprising:
an LED lamp having a plurality of LED channels, each of the plurality of LED channels having a channel switch in series with at least one shunted LED circuit, the shunted LED circuit having a shunt switch in parallel with an LED source;
means for initializing LED lamp settings for the LED lamp;
means for determining whether the LED source is in a feedback controllable range;
means for storing measured optical flux for the LED source when the LED source is in the feedback controllable range; and
means for bypassing storage of the measured optical flux when the LED source is not in the feedback controllable range.

* * * * *